(12) United States Patent
Jiang (10) Patent No.: US 8,303,141 B2
(45) Date of Patent: Nov. 6, 2012

(54) TOTAL INTERNAL REFLECTION LENS WITH INTEGRATED LAMP COVER

(75) Inventor: Wu Jiang, Sunnyvale, CA (US)

(73) Assignee: LedEngin, Inc., San Jose, CA (US)

( * ) Notice: Subject to any disclaimer, the term of this patent is extended or adjusted under 35 U.S.C. 154(b) by 578 days.

(21) Appl. No.: 12/640,432

(22) Filed: Dec. 17, 2009

(65) Prior Publication Data

US 2011/0149581 A1    Jun. 23, 2011

(51) Int. Cl.
*F21V 5/00* (2006.01)
(52) U.S. Cl. ......... 362/338; 362/334; 362/337; 126/698
(58) Field of Classification Search ................ 362/338, 362/334, 335, 336, 337; 126/698, 699, 692, 126/688
See application file for complete search history.

(56) References Cited

U.S. PATENT DOCUMENTS

| | | | |
|---|---|---|---|
| 5,742,120 A | 4/1998 | Lin | |
| 5,959,316 A | 9/1999 | Lowery | |
| 6,307,160 B1 | 10/2001 | Mei et al. | |
| 6,351,069 B1 | 2/2002 | Lowery et al. | |
| 6,608,332 B2 | 8/2003 | Shimizu et al. | |
| 6,614,179 B1 | 9/2003 | Shimizu et al. | |
| 6,642,652 B2 | 11/2003 | Collins, III et al. | |
| 6,680,128 B2 | 1/2004 | Mei | |
| 6,791,116 B2 | 9/2004 | Hirano et al. | |
| 6,828,170 B2 | 12/2004 | Roberts et al. | |
| 6,833,565 B2 | 12/2004 | Su et al. | |
| 7,064,353 B2 | 6/2006 | Bhat | |
| 7,156,538 B2 | 1/2007 | Han et al. | |
| 7,157,744 B2 | 1/2007 | Palmteer et al. | |
| 7,168,608 B2 | 1/2007 | Mei | |
| 7,199,446 B1 | 4/2007 | Mei et al. | |
| 7,264,378 B2 | 9/2007 | Loh | |
| 7,670,872 B2 | 3/2010 | Yan | |
| 2001/0015778 A1 | 8/2001 | Murade | |
| 2002/0015013 A1 | 2/2002 | Ragle | |
| 2002/0163006 A1 | 11/2002 | Yoganandan et al. | |
| 2002/0191885 A1 | 12/2002 | Wu et al. | |
| 2003/0016899 A1 | 1/2003 | Yan | |
| 2003/0086674 A1 | 5/2003 | Yan et al. | |
| 2003/0095399 A1 | 5/2003 | Grenda et al. | |
| 2003/0116769 A1 | 6/2003 | Song et al. | |
| 2003/0122482 A1 | 7/2003 | Yamanaka et al. | |

(Continued)

FOREIGN PATENT DOCUMENTS

JP        2000-349346        12/2000

(Continued)

OTHER PUBLICATIONS

Kading, O.W., "Thermal Conduction in Metallized Silicon-Dioxide Layers on Silicon," Applied Physics, Sep. 1994, vol. 65, No. 13, pp. 1629-1631.

(Continued)

*Primary Examiner* — Joseph L Williams
(74) *Attorney, Agent, or Firm* — Kilpatrick Townsend & Stockton LLP (57) ABSTRACT

A total internal reflection (TIR) lens has an integrated lamp cover adapted to a lamp of a desired form factor (e.g., PAR-38). The size and shape of the TIR lens can be adapted to optimize the light output of the lamp with little regard to the desired form factor. The integrated lamp cover can extend the front surface of the TIR lens in a direction transverse from the optical axis.

16 Claims, 4 Drawing Sheets

U.S. PATENT DOCUMENTS

| | | |
|---|---|---|
| 2003/0227249 A1 | 12/2003 | Mueller et al. |
| 2003/0230977 A1 | 12/2003 | Epstein |
| 2004/0004437 A1 | 1/2004 | Shimizu et al. |
| 2004/0051111 A1 | 3/2004 | Ota et al. |
| 2004/0079957 A1 | 4/2004 | Andrews et al. |
| 2004/0102061 A1 | 5/2004 | Watanabe |
| 2004/0126918 A1 | 7/2004 | Kurahashi et al. |
| 2004/0173810 A1 | 9/2004 | Lin et al. |
| 2004/0201025 A1 | 10/2004 | Barnett et al. |
| 2004/0257496 A1 | 12/2004 | Sonoda |
| 2005/0035364 A1 | 2/2005 | Sano et al. |
| 2005/0062140 A1 | 3/2005 | Leung et al. |
| 2005/0093146 A1 | 5/2005 | Sakano |
| 2005/0145872 A1 | 7/2005 | Fang et al. |
| 2005/0179376 A1 | 8/2005 | Fung et al. |
| 2005/0199900 A1 | 9/2005 | Lin et al. |
| 2005/0224830 A1 | 10/2005 | Blonder et al. |
| 2005/0253242 A1 | 11/2005 | Costello et al. |
| 2005/0270666 A1 | 12/2005 | Loh et al. |
| 2005/0286131 A1 | 12/2005 | Saxena et al. |
| 2006/0012299 A1 | 1/2006 | Suehiro et al. |
| 2006/0063287 A1 | 3/2006 | Andrews |
| 2006/0082296 A1 | 4/2006 | Chua et al. |
| 2006/0082679 A1 | 4/2006 | Chua et al. |
| 2006/0091788 A1 | 5/2006 | Yan |
| 2006/0097385 A1 | 5/2006 | Negley |
| 2006/0170332 A1 | 8/2006 | Tamaki et al. |
| 2006/0284209 A1 | 12/2006 | Kim et al. |
| 2007/0194341 A1 | 8/2007 | Chang et al. |
| 2007/0223219 A1 | 9/2007 | Medendorp, Jr. et al. |
| 2007/0278512 A1 | 12/2007 | Loh et al. |
| 2008/0308825 A1 | 12/2008 | Chakraborty et al. |
| 2010/0091499 A1 | 4/2010 | Jiang et al. |
| 2010/0155755 A1 | 6/2010 | Dong |
| 2010/0259924 A1 | 10/2010 | Dong |

FOREIGN PATENT DOCUMENTS

| | | |
|---|---|---|
| JP | 2000-349347 | 12/2000 |
| JP | 2001-057445 | 2/2001 |
| JP | 2002-185046 | 6/2002 |
| JP | 2004-241704 | 8/2004 |
| JP | 2004-253404 | 9/2004 |

OTHER PUBLICATIONS

Official Action for Japanese Patent Application No. 2005-315149, dated Jul. 21, 2009, 3 pages total.

"Solvent Soluble Polyimide with High Transparency and High Tg: HOP-400, 500," Hitachi Cable Review, Aug. 2003, No. 22, p. 78.

Yan, Xiantao, "Two Test Specimens for Determining the Interfacial Fracture Toughness in Flip-Chip Assemblies," Jun. 1998, Transactions of the ASME, vol. 120, pp. 150-155.

Yan, Xiantao, "Analysis Based Design Guidelines for Metal Runner and Passivation Layers in IC Packaging," DELPHI Automotive Systems, Analytical Engineering Conference, May 2000, pp. 1-4.

Non-Final Office Action for U.S. Appl. No. 12/420,800, mailed on Sep. 28, 2010, 11 pages.

Final Office Action for U.S. Appl. No. 11/036,559, mailed on Jun. 7, 2010, 11 pages.

Non-Final Office Action for U.S. Appl. No. 11/796,240, mailed on Dec. 9, 2009, 11 pages.

Notice of Allowance for U.S. Appl. No. 11/260,101, mailed on Nov. 20, 2009, 4 pages.

Non-Final Office Action for U.S. Appl. No. 11/036,559, mailed on Aug. 18, 2009, 15 pages.

Final Office Action for U.S. Appl. No. 11/796,240, mailed on Jul. 15, 2009, 11 pages.

Non-Final Office Action for U.S. Appl. No. 11/260,101, mailed on Jun. 9, 2009, 21 pages.

Non-Final Office Action for U.S. Appl. No. 11/796,240, mailed on Feb. 12, 2009, 6 pages.

Non-Final Office Action for U.S. Appl. No. 11/036,559, mailed on Feb. 3, 2009, 8 pages.

Final Office Action for U.S. Appl. No. 11/260,101 mailed on Dec. 16, 2008, 23 pages.

Requirement for Restriction/Election for U.S. Appl. No. 11/796,240, mailed on Dec. 4, 2008, 5 pages.

Non-Final Office Action for U.S. Appl. No. 11/036,559, mailed on Sep. 16, 2008, 14 pages.

Requirement for Restriction/Election for U.S. Appl. No. 11/796,240, mailed on Aug. 20, 2008, 3 pages.

Non-Final Office Action for U.S. Appl. No. 11/260,101, mailed on Jul. 23, 2008, 18 pages.

Final Office Action for U.S. Appl. No. 11/036,559, mailed on May 15, 2008, 17 pages.

Final Office Action for U.S. Appl. No. 11/260,101, mailed on May 13, 2008, 16 pages.

Non-Final Office Action for U.S. Appl. No. 11/260,101, mailed on Dec. 4, 2007, 11 pages.

Requirement for Restriction/Election for U.S. Appl. No. 11/036,559, mailed on Sep. 19, 2007, 11 pages.

"LRP-38-The first viable LED lamp that combines the vibrant color of halogen with high efficacy"; http://www.creeledlighting.com/lrp-38.htm, 1 page.

TOTAL INTERNAL REFLECTION LENS WITH INTEGRATED LAMP COVER

CROSS-REFERENCES TO RELATED APPLICATIONS

The present disclosure is related to commonly-assigned co-pending U.S. patent application Ser. No. 12/420,802, filed Apr. 8, 2009, the disclosure of which is incorporated herein by reference in its entirety.

BACKGROUND OF THE INVENTION

The present disclosure relates generally to lighting apparatus and in particular to a total internal reflection (TIR) lens with an integrated lamp cover.

The incandescent light bulb is over 100 years old. While it is still in widespread use, much effort is being directed to replacing incandescent bulbs with more energy-efficient lighting technologies such as compact fluorescent bulbs or lamps based on light-emitting-diodes (LEDs).

One challenge facing these new technologies is integration with the substantial infrastructure that supports incandescent bulbs. For example, many existing light fixtures provide standard threaded sockets into which an incandescent bulb having a standard threaded screw base can be inserted, allowing the user to easily replace a burned-out bulb. Most buildings have permanently installed light fixtures, such as "can" lights mounted into ceilings, "track" lights in which individual light fixtures can be positioned along a track, and so on. These fixtures are often designed to accommodate incandescent bulbs having various standard form factors.

One example of a standard light-bulb form factor is "PAR-38." This term of art refers to a bulb with a parabolic aluminum reflector, a transparent or translucent front cover that allows light to escape, and a diameter of 38 eighths of an inch (4.75 inches, or 107.95 millimeters (mm)). PAR-38 light bulbs are commonly used in applications such as recessed light fixtures, security lights, spotlights, or other applications where directed light is desired.

To facilitate conversion from incandescent bulbs to newer technologies, it is advantageous to make lamps based on LED or other energy-efficient technology that have form factors and screw-threaded bases compatible with existing fixtures designed for incandescent light bulbs, thereby eliminating the expense and difficulty of replacing existing light fixtures in order to accommodate new types of lighting.

To be successful as a replacement for existing light bulbs, an LED-based lamp should have a form factor approximating that of the light bulb to be replaced and external electrical connections compatible with existing light fixtures. In addition, the lamp should be robust, provide a satisfactory light quality, and have an attractive appearance.

BRIEF SUMMARY OF THE INVENTION

Embodiments of the present invention provide total internal reflection (TIR) lenses with integrated lamp covers that can be used in LED-based lamps. The size and shape of the TIR lens can be adapted to optimize the light output of the lamp with little regard to the form factor required for a particular application. The integrated lamp cover can extend the front surface (i.e., the surface where light from the source exits) of the TIR lens outward from the optical axis to better match the form factor of a particular lamp while providing esthetic benefits in the quality of light and the decorative look of the installed lamp. In some embodiments, the TIR lens and cover can be adapted for use in a light-bulb-replacement lamp that corresponds to a standard form factor such as PAR-38.

According to one embodiment, a lens assembly includes a total internal reflection (TIR) body member and a cover member. The TIR body member is substantially cylindrically symmetric with respect to an optical axis, and its outer surface has a tapered shape along the optical axis such that the TIR body member is wider at one end than at the other. The tapered shape provides total internal reflection to direct light from a light source position near the narrower end toward the wider end. The cover member, which is integral with the TIR body member, is disposed at the wider end of the TIR body member. The cover member's width in a direction transverse to the optical axis is greater than a widest diameter of the TIR body member, and its thickness in a direction along the optical axis is less than a thickness of the TIR body member.

The cover member can be significantly thinner than the TIR body member. For example, the thickness of the cover member can be less than about 10% of the total thickness of the lens assembly and it can be at least about 5% of the total thickness.

Similarly, the cover member can be significantly wider than the wider end of the TIR body member. For example, the widest diameter of the TIR body might be no more than about 40% of the width of the cover member and might be at least about 25% of the width of the cover member.

The following detailed description together with the accompanying drawings will provide a better understanding of the nature and advantages of the present invention.

DETAILED DESCRIPTION OF THE INVENTION

Certain embodiments of the present invention relate to secondary lenses for LED-based lamps, and in particular to secondary lenses with an integrated lamp cover. The lamp cover can be formed as an outward radial extension of the front face of a total internal reflection (TIR) lens, and a pattern of microlenses on the front surface of the cover can be provided to distribute the light for an esthetically pleasing effect.

Figure 1:
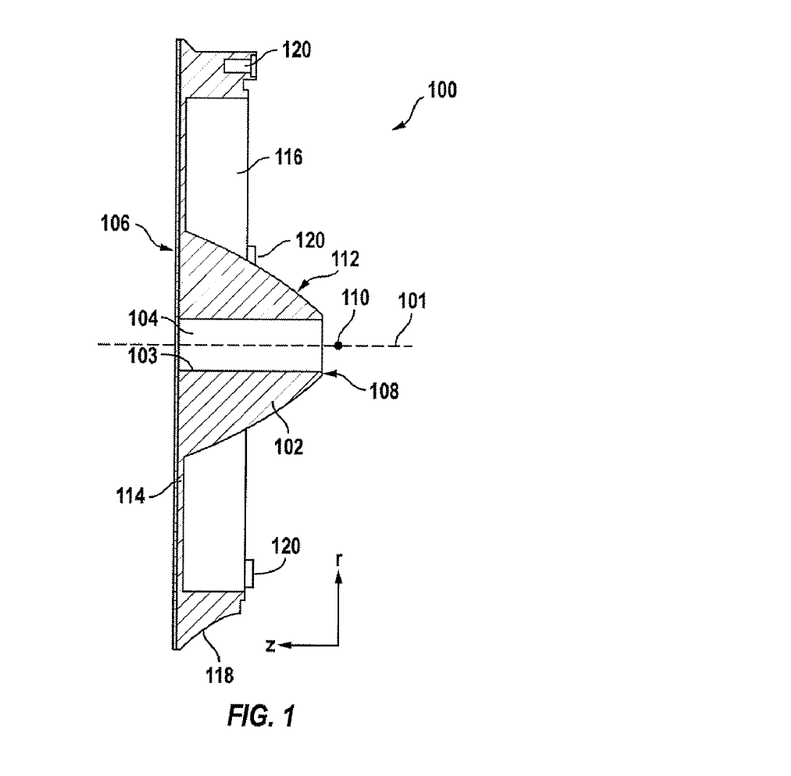
FIG. 1 is a side cross sectional view of a lens according to an embodiment of the present invention.

FIG. 1 is a side cross sectional view of a lens 100 according to an embodiment of the present invention. Lens 100 has a TIR body portion 102 with a generally cylindrical open channel 104 extending therethrough from a front surface 106 to a rear surface 108. A light source (not explicitly shown) can be placed at a light source position 110 near opening 104 at the rear end (defined by rear surface 108). A specific example of an LED-based light source suitable for use as a light source with lens 100 is described below.

TIR body portion 102 is advantageously shaped to direct light from a light source placed at position 110 outward through front surface 106, thereby providing illumination. In particular, outer side surface 112 of TIR body portion 102, which is substantially (i.e., within manufacturing tolerances) symmetric about optical axis 101, is advantageously curved so as to provide total internal reflection of light from a light source placed at position 110 toward front surface 106. For example, in some embodiments, the shape of side surface 112 can be described by the following equation in cylindrical coordinates (r, z), where z is the longitudinal coordinate along optical axis 101 and r is the radial coordinate representing distance from optical axis 101:

$$z = \frac{cr^2}{1 + \sqrt{1 - (1+k)c^2 r^2}}. \quad (1)$$

In Eq. (1), c (curvature) and k (conic constant) are parameters that can be adjusted to optimize total internal reflection and/or light output for a particular light source. In one embodiment optimized for use in a PAR-38 lamp with a 12-LED light source (as described below), c=0.181 and k=−1.1192. These values may be varied for other applications. In some embodiments, the z=0 plane (the vertex of the conic described by Eq. (1)) does not precisely coincide with rear surface 108 of lens 100. For example, in one embodiment suitable for use in a PAR-38 lamp, the z=0 plane is about 2.2 mm behind rear surface 108, corresponding to light source position 110. Further examples of shaping of surface 112 for specific LED light sources can be found in above-referenced U.S. patent application Ser. No. 12/420,802.

The thickness (in the z direction) of lens 100 can be chosen to optimize light output subject to overall form factor constraints associated with the lamp in which lens 100 is to be used. In one embodiment suitable for use in a PAR-38 lamp, lens 100 is about 25 mm thick.

Inner side wall 103 is also substantially symmetric about optical axis 101 and defines an open channel 104 through the middle of the lens. Inner side wall 103 may have a slight taper (e.g., an inward angle of approximately 1°, 2.5°, 5°, or the like) to facilitate manufacturing; thus, for example, open channel 104 may be slightly wider at front surface 106 than at rear surface 108. In some embodiments, the presence of open channel 104 provides enhanced light reflection and collimation of light in the central region, as well as mixing of light from multiple LEDs within a single light source to improve uniformity of light output.

The radius of open channel 104 can be chosen to optimize light output, subject to the constraint that for any particular z within lens 100, the radius of open channel 104 must be smaller than the radius r that satisfies Eq. (1). In one embodiment suitable for use in a PAR-38 lamp, open channel 104 has a radius of about 4.3 mm at rear surface 108 and about 4.8 mm at front surface 104.

In operation, light from a light source at approximately location 110 enters lens 100 from the rear. Some of the light strikes surface 112 from within and is internally reflected toward front surface 106, thereby reducing light loss through the sides of lens 100 and increasing light output through front surface 106. It is to be understood that total internal reflection need not be 100% efficient; some light loss may occur. For example, the efficiency of lens 100 can be 70% or higher; in one embodiment the efficiency is about 80-85%.

Front surface 106, which can also be substantially symmetric about optical axis 101, extends in the radial direction across and outward from TIR body portion 102, thereby providing a cover portion 114. Cover portion 114 is advantageously integral (i.e., a continuous piece of material) with TIR body portion 102 such that there is no material interface between the two portions.

Cover portion 114 can be circular (e.g., a disc shape) and as thin as desired. In general, cover portion 114 can be thick enough to provide rigidity and strength, but thin enough that the total internal reflection provided by side surface 112 of main body portion 108 is not adversely affected. For example, cover portion 114 can be 1.5 millimeters thick. In this embodiment, front surface 106 is patterned with microlenses, as described below.

The radius of cover portion 114 can be chosen as desired. In some embodiments, cover portion 114 can provide further beam shaping via microlenses as described below. Cover portion 114 also can provide esthetic and/or protective advantages. For example as described below, cover portion 114 can help to conceal the LED-based light source from a user's view and/or keep potentially damaging foreign objects out of the area of the LED-based light source.

In the embodiment of FIG. 1, a flange 116 extends backward from the outer peripheral edge of cover portion 114. Flange 116 can be sized and shaped to provide support and alignment for mounting of lens 100 in a lamp, e.g., as described below. In the example shown, flange 116 has a tapered outer surface 118. The thickness and shaping of flange 116 can be varied as desired and can be advantageously adapted to facilitating mounting of lens 100 in a particular lamp. In one embodiment suitable for a PAR-38 lamp, flange 116 has a thickness (in the z direction) of about 11 mm.

A number of mounting posts 120 can also be provided at the outer peripheral edge of cover portion 114; in some embodiments, mounting posts 120 are integral with flange 116 and can partially protrude from the material of flange 116. Any number of mounting posts 120 can be provided. For example, one or two mounting posts 120 may be sufficient to secure lens 100 in a lamp; three mounting posts 120 can define a planar orientation for front surface 106; additional posts 120 can be provided as desired for enhanced stability and/or security of mounting; thus, various embodiments may have different numbers of mounting posts.

Figure 2:
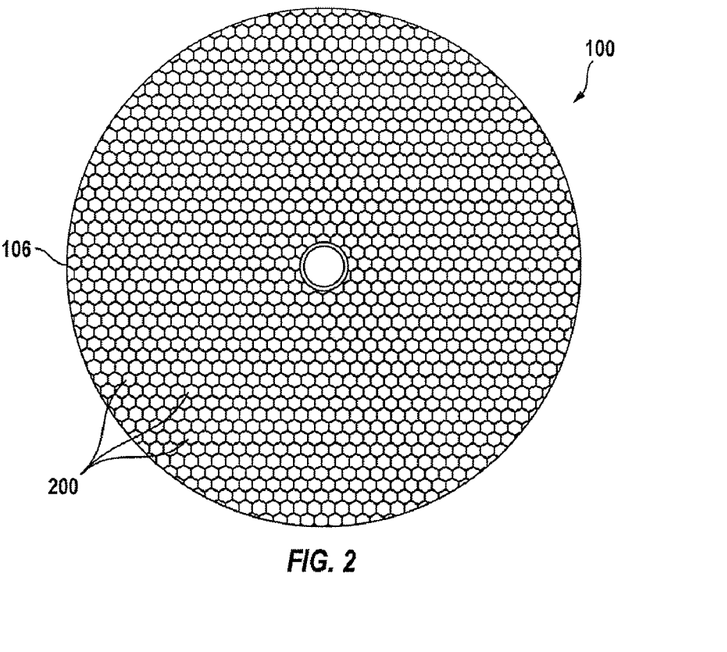
FIG. 2 is a front view of the lens of FIG. 1.

FIG. 2 is a front view of lens 100 showing that front surface 106 is patterned with microlenses 200. In this embodiment, microlenses 200 are hexagonal and closely packed, tiling front surface 106 in a honeycomb pattern. Other patterns may also be substituted.

Figure 3A:
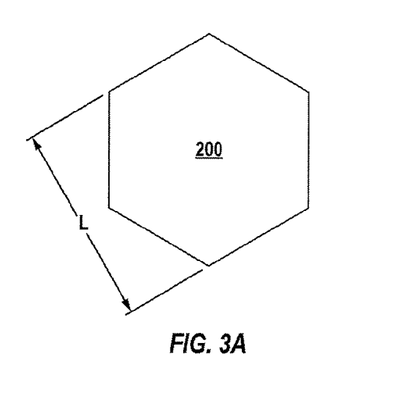
FIG. 3A is a front view of a microlens according to an embodiment of the present invention.
Figure 3B:
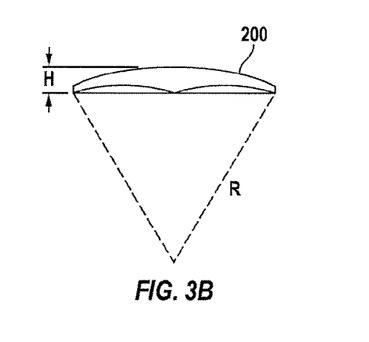
FIG. 3B is a side view of a microlens according to an embodiment of the present invention.

FIGS. 3A and 3B are, respectively, a front view and a side view of a single microlens 200. As shown in FIG. 3A, microlens 200 can be a regular hexagon with a lateral dimension L. As shown in FIG. 3B, microlens 200 can have a radius of curvature R and a height H. The parameters L, R and H can be varied to produce light beams with different beam spread characteristics. In one embodiment suitable for a PAR-38 lamp, L=1.51 mm, R=2.00 mm and H=0.20 mm. This provides a "medium" beam spread of about 20-24° (full width at half maximum, or FWHM). Other choices of parameters will produce different beam spread. For example L=1.33 mm, R=3.0 mm and H=0.1 mm provides a "narrow" beam spread of about 12-15° FWHM; L=3.0 mm, R=3.00 mm and H=0.55 mm provides a "wide" beam spread of about 32-36° FWHM. It should be noted that selection of the (R, H, L) values that govern beam shape can be largely independent of selection of the curvature parameters k and c in Eq. (1). Further examples of microlenses are described in above-referenced U.S. patent application Ser. No. 12/420,802.

Figure 4:
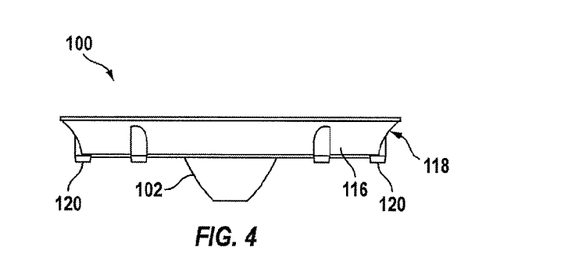
FIG. 4 is a side view of the lens of FIG. 1.
Figure 5:
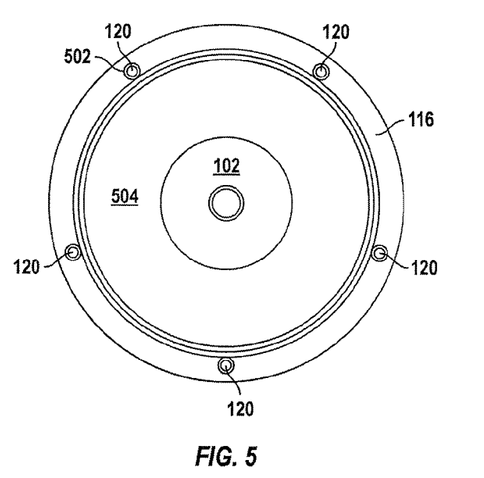
FIG. 5 is a rear view of the lens of FIG. 1.
Figure 6:
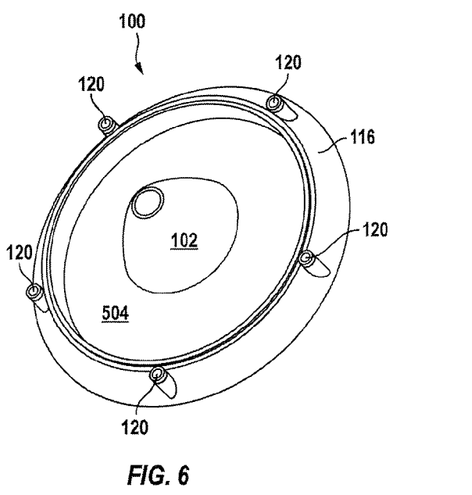
FIG. 6 is a rear perspective view of the lens of FIG. 1.

FIGS. 4-6 are, respectively, a side view, a rear view and a rear perspective view of lens 100 further illustrating the arrangement of parts. As shown, flange 116 can extend rearward from the entire periphery of cover portion 114. Flange 116 can have a tapered outer surface 118, and mounting posts 120 can protrude from the tapered surface. As best seen in FIG. 4, the rear faces of mounting posts 120 can extend slightly beyond the rear end of flange 116. (For example, mounting posts 120 can be about 1.5 mm longer than the front-to-back thickness of flange 116.) As best seen in FIGS. 5 and 6, in one embodiment, five mounting posts 120 are equally spaced around the perimeter of flange 116; other embodiments may include other numbers and/or arrangements of mounting posts. As best seen in FIG. 5, mounting posts 120 can be generally cylindrical with central holes 502 extending forward from the rear face. Holes 502 can accommodate pins, posts, screws, or the like to align and/or hold lens 100 in a lamp.

Also, as seen in FIGS. 5 and 6, the back surface 504 of cover portion 114 of lens 100 can include a flat surface region extending from TIR body portion 102 to flange 116.

In lens 100, outer surface 112 of TIR body portion 102 is shaped to provide total internal reflection, preventing light loss. Interior open channel 104 tends to collimate light in the central region. Microlenses 200 on front surface 106 operate to distribute light uniformly and shape the light beam to provide the desired area of illumination. The dimensions and shaping of lens 100 can be chosen as desired, based on considerations such as the light source, the degree of beam collimation desired, the overall form factor of the lamp in which lens 100 is intended for use, and the like.

Cover portion 114, which is advantageously integral with TIR body portion 102, provides further light dispersion (via microlenses 200) as well as esthetic and/or protective benefits. Accordingly, in some embodiments, it is desirable that cover portion 114 extend nearly to the outer radius of the lamp in which lens 100 is to be used. For example, in one embodiment for a PAR-38 lamp, cover portion 114 has a diameter of about 102.6 mm. This is somewhat less than the 107.95-mm diameter of a standard PAR-38 light bulb. This design choice leaves space for additional peripheral lens-holding and support structures, examples of which are described below. Different diameters may also be chosen according to the overall design and form factor of a particular lamp.

It will be appreciated that lens 100 described herein is illustrative and that variations and modifications are possible. The size, shape, and curvature of the TIR body portion and/or cover portion can be varied. Different patterns of microlenses can be used. As noted above, the size and shape of TIR body portion 102 and microlenses 200 can advantageously be optimized for a particular light source and lamp form factor. Further, while open channel 104 can provide improved lens performance for some light-source configurations, the presence of open channel 104 is optional and some embodiments might provide a solid TIR lens body without any through-openings.

The size and shape of cover portion 114 can advantageously be optimized for the lamp form factor while not adversely affecting the optical characteristics of lens 100. Providing cover portion 114 as an integral part of lens 100, as opposed to adding a separate cover, can reduce light loss by reducing the number of refractive surface boundaries in the light path.

The relative thickness (along the optical axis) of TIR body portion 102 and cover portion 114 can also be varied as desired. It should be noted that cover portion 114 does not provide significant total internal reflection back toward the optical axis, so a thicker cover portion may lead to wider light scattering and a weaker central beam. (In some applications, this effect may be desirable.) Accordingly, the tapered outer surface 112 of TIR body portion 102 advantageously extends far enough along the optical axis to provide the desired degree of collimation, and light output; cover portion 114 can be kept relatively thin. For example, in one embodiment described above, the flat section of cover portion 114 has a thickness of about 1.5 mm while lens 100 has a thickness of about 25 mm; in this case, the thickness of cover portion 114 is about 6% of the total thickness of lens 100. In other embodiments, cover portion 114 can be relatively thicker, e.g., 10% of the total thickness, or relatively thinner, e.g., 5% or less of the total thickness.

The width (transverse to the optical axis) of TIR body portion 102 is advantageously determined by the desire to optimize the output light. Cover portion 114 has little optical effect, and so its dimensions can be chosen based on esthetic and manufacturing considerations. For instance, the width of cover portion 114 is advantageously determined based on the form factor and desired esthetic appearance of a lamp in which lens 100 is to be used. Accordingly, cover portion 114 can be significantly wider than the width of TIR body portion 102 at the point where the two portions meet. For example, in one embodiment the maximum width of TIR body portion 102 is between 25% and 40% of the width of cover portion 114. In other embodiments, the maximum width of the TIR body portion can be, e.g., less than half or less than 75% of the width of cover portion 114.

The thickness of cover portion 114 can be determined according to the manufacturing process and the desired durability. For example, a thicker cover portion 114 may be more subject to flatness distortion in a molding process, and a thinner cover portion 114 may be more prone to breaking.

Flange 116 has negligible effect on the optical properties of lens 100 and can be eliminated or replaced with a different strengthening and/or alignment structure. For example, alignment tabs, indentations or the like can be used. In addition, although flange 116 is shown as being integral with the rest of lens 100, in some embodiments, a flange or other strengthening and/or alignment structures can be formed separately and attached to the back or peripheral edge of an integrated lens cover.

Lens 100 can be made of any suitable optically transparent material. In some embodiments, a conventional optical plastic such as a poly(methylmethacrylate) (PMMA) is used; other optically transparent plastics or glass may also be used. Lens 100 can be manufactured, e.g., using conventional techniques for fabricating plastic articles, such as molding. Cover portion 114 and TIR body portion 102 are advantageously formed of the same material as a single integrated object, thereby reducing the number of material interfaces at which light can be lost. Thus, for example, lens 100 can be formed in a single molding process.

Figure 7A:
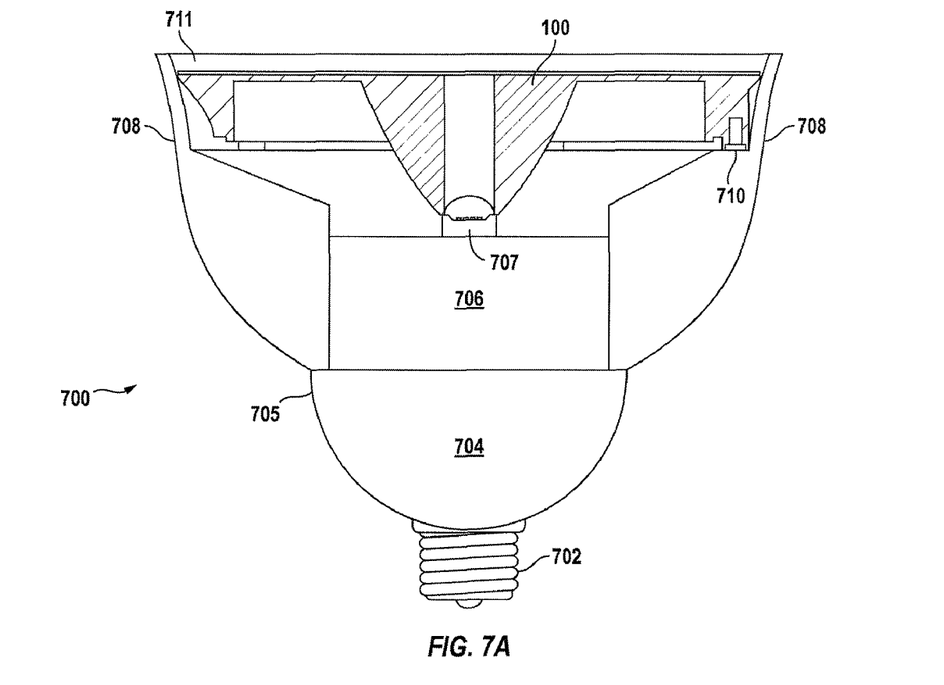
FIG. 7A is a simplified cutaway side view of a lamp incorporating a lens according to an embodiment of the present invention.
Figure 7B:
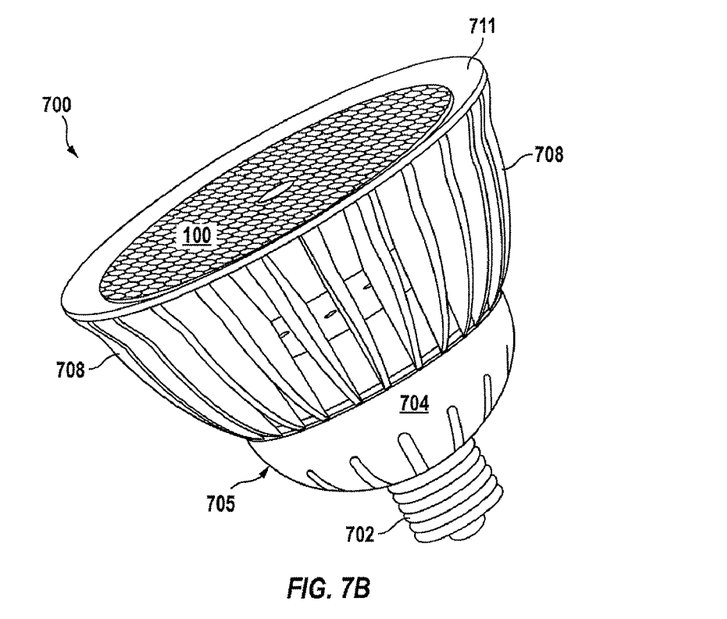
FIG. 7B is a front perspective view of a lamp incorporating a lens according to an embodiment of the present invention.

Lens 100 can be integrated into an LED-based lamp having a desired form factor. An example is shown in FIGS. 7A and 7B, which are, respectively, a simplified cutaway side view and a front perspective view of a lamp 700 incorporating lens 100 according to an embodiment of the present invention. In this example, lamp 700 is an LED-based replacement for a standard PAR-38 lamp and has approximately the same size and overall shape as a conventional incandescent PAR-38 bulb.

Lamp 700 includes a screw base 702 and a frame 704. Screw base 702 can be electrically and mechanically compatible with a standard light-bulb socket. Frame 704, which can be made of aluminum or other metal or other materials, has an outer surface 705 shaped generally similar to a conventional PAR-38 bulb. In some embodiments, frame 704 can be designed to facilitate heat dissipation and may include various openings, fins, or the like to allow for ventilation and/or weight reduction.

Frame 704 defines a platform 706, as best seen in FIG. 7A. Platform 706 holds a light source 707, which can be an LED-based light source (an example is described below). Frame 704 and platform surface 706 can incorporate electrical connections (not shown) to provide power to light source 707 from screw base 702. In some embodiments, these connections can include exposed wiring and/or components disposed on the surface of platform 706.

Frame 704 also includes arms 708 that extend toward the front of lamp 700. Arms 708 can be shaped to accommodate lens 100, and some or all of arms 708 can include mounting structures 710 that receive and connect to mounting posts 120 of lens 100, thereby holding lens 100 in position in relation to light source 707 and frame 704. In some embodiments, arms 708 can extend forward slightly beyond front surface 106 of lens 100. Arms 708 can be connected to each other by a peripheral metal rim 711 that protects lens 100 and that also provides a surface that a user can hold to facilitate installation of lamp 700 in a light fixture and/or removal of lamp 700 from a light fixture.

In this embodiment, cover member 114 of lens 100 extends to the inner edge of metal rim 711. This configuration protects the edges of cover member 114 while at the same time providing the esthetic benefit that cover member 114 covers the front face of lamp 700. Microlenses 200 on front surface 106 of lens 100 disperse light such that a person looking at lamp 700 from the front would not clearly see platform surface 706 or any wires or other functional elements that may be disposed thereon, regardless of whether lamp 700 is generating light or not. Thus, cover member 114 can provide the esthetic benefit of screening working structures within lamp 700 from the view of the user when lamp 700 is viewed from the front, as it would typically be when installed in a recessed or cylindrical light fixture. When lamp 100 is installed in a recessed light fixture, cover member 114 also limits access to the interior region of lamp 700 and thus may help to protect light source 708 and/or associated wiring or other components from damage.

Figure 8A:
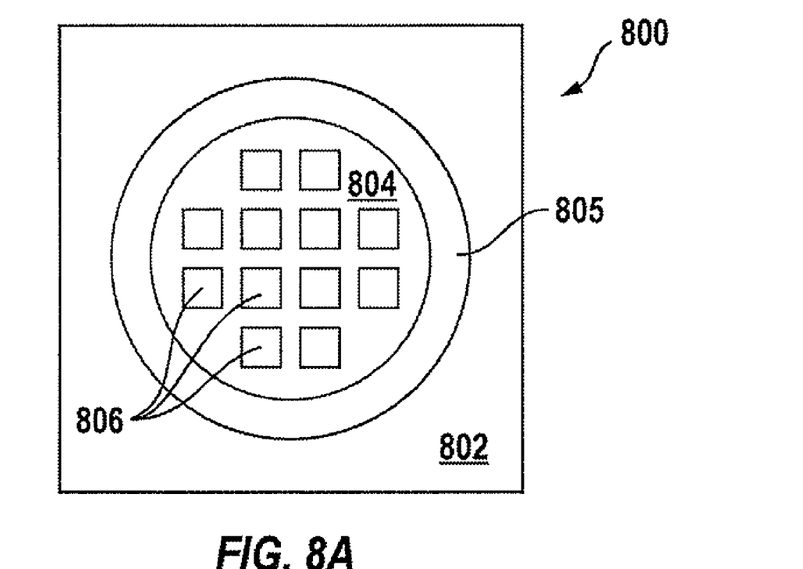
FIG. 8A is a top view of an LED-based light source suitable for use with a lens according to an embodiment of the present invention.
Figure 8B:
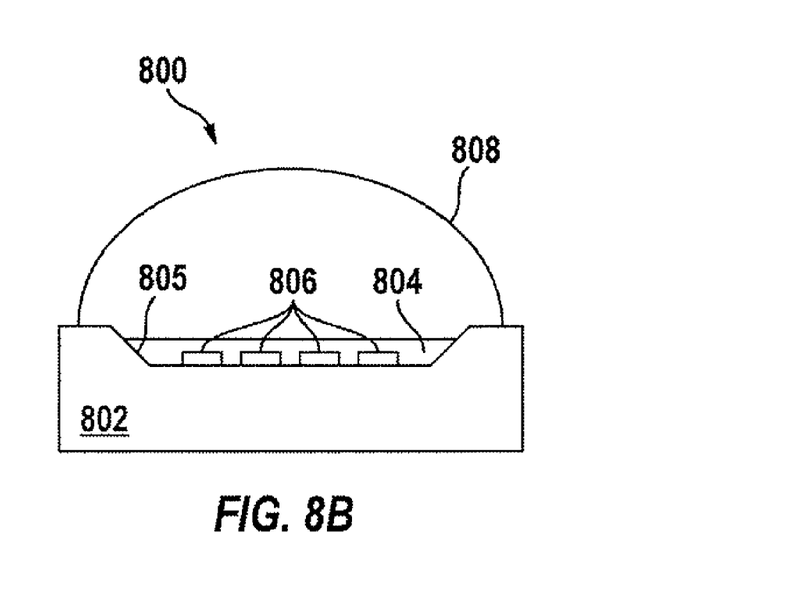
FIG. 8B is a side cross-section view of an LED-based light source suitable for use with a lens according to an embodiment of the present invention.

FIGS. 8A and 8B are, respectively, a top view and a side cross-section view of an LED-based light source 800 suitable for use with lens 100 (e.g., in lamp 700 of FIG. 7) according to an embodiment of the present invention. Light source 800 can be constructed on a substrate 802, e.g., within a recess 804 that is defined by a sidewall 805. A number (e.g., 12) of LEDs 806 are arranged within recess 804. LEDs 806 can be, e.g., white LEDs with similar or varying color temperature. In some embodiments, LEDs 806 are blue LED dice with a yellow phosphor layer coating applied to the top surface of each die; other types of LEDs can also be used.

Recess 804 is at least partially filled with an optically transparent material (e.g., silicone gel) to protect LEDs 806. A primary lens 808 is disposed over recess 804 and can extend into recess 804, e.g., as shown in FIG. 8B.

In some embodiments, light source 800 can be similar to light source configurations described in commonly-assigned co-pending U.S. patent application Ser. No. 12/420,800, filed Apr. 8, 2009, and commonly-assigned co-pending U.S. Provisional Patent Application No. 61/167,761, filed Apr. 8, 2009. For example, LEDs 806 can include LEDs having different color temperatures; electrical connections can be provided in a manner that allows single LEDs 806 and/or groups of LEDs 806 to be independently current-controlled, thereby allowing the color temperature of light produced by light source 800 to be adjusted by adjusting the relative amount of current delivered to different LEDs 806. In other embodiments, other types and configurations of LEDs may also be used.

It will be appreciated that the lamp and LED-based light source described herein is illustrative and that variations and modifications are possible. LED-based lamps can be constructed with a variety of form factors, including form factors compatible with a number of existing light-bulb types; electrical connection and light output can be varied. The light source in a particular lamp can also be varied and can include any number and arrangement of LEDs. In some instances, light from LEDs of different colors can be mixed by a TIR lens to produce white light or other desired lighting effects.

While the invention has been described with respect to specific embodiments, one skilled in the art will recognize that numerous modifications are possible. For example, certain embodiments described herein are suited for use in PAR-38 lamps and have dimensions conforming to the standard PAR-38 form factor. However, the invention is not limited to PAR-38 lamps or to any particular form factor. Indeed, as noted above, TIR lenses can be optimized for different LED light source configurations suitable for use in a variety of different lamps. Any TIR lens can be augmented with an integrated cover, e.g., as described herein, and the dimensions of the lens and cover may be optimized for compatibility with the form factor of a particular lamp. Accordingly, all examples described herein are intended as illustrative and not limiting.

As noted above, the shape of the cover portion of an integrated lens and cover can be chosen based on esthetic considerations. For example, while circular covers consistent with form factors of certain conventional lamps have been described, the cover portion could be non-circular (e.g., oval or rectangle). Similarly, while the cover portion is shown as flat in some embodiments, the surface of the cover portion could also be curved.

Thus, although the invention has been described with respect to specific embodiments, it will be appreciated that the invention is intended to cover all modifications and equivalents within the scope of the following claims.

What is claimed is:

1. A lens assembly comprising:
   a total internal reflection (TIR) body member having a first end, a second end opposite the first end, and an outer surface, the TIR body member being substantially cylindrically symmetric with respect to an optical axis, the outer surface having a tapered shape such that the TIR body member is wider at the second end than at the first end, the tapered shape providing total internal reflection to direct light from a light source position near the first end toward the second end; and
   a cover member disposed at the second end of the TIR body member and integral with the TIR body member, the cover member having a width in a direction transverse to the optical axis that is greater than a widest diameter of the TIR body member and a thickness in a direction along the optical axis that is less than a thickness of the TIR body member.

2. The lens assembly of claim 1 wherein the thickness of the cover member is not more than about 10% of a total thickness of the lens assembly.

3. The lens assembly of claim 2 wherein the thickness of the cover member is between about 5% and about 10% of a total thickness of the lens assembly.

4. The lens assembly of claim 1 wherein the widest diameter of the TIR body member is not more than about 40% of the width of the cover member.

5. The lens assembly of claim 4 wherein the widest diameter of the TIR body member is between about 25% and about 40% of the width of the cover member.

6. The lens assembly of claim 1 wherein the TIR body member further includes an inner sidewall defining a central open channel that extends longitudinally from the first end to the second end, the central open channel being centered on and substantially symmetric with respect to the optical axis.

7. The lens assembly of claim 6 wherein the central open channel extends through the cover member.

8. The lens assembly of claim 7 wherein the inner sidewall and the outer surface of the TIR body member are shaped so as to provide mixing of light from a plurality of light emitting diodes within a light source.

9. The lens assembly of claim 7 wherein the inner sidewall is tapered at an angle between about 1° and about 5° relative to the optical axis, such that the open channel is wider at the second end than at the first end.

10. The lens assembly of claim 1 wherein the TIR body member and the cover member are made of poly(methylmethacrylate).

11. The lens assembly of claim 1 further comprising a flange disposed near a peripheral edge of the front end face member and extending rearwardly therefrom.

12. The lens assembly of claim 11 further comprising a plurality of mounting posts extending rearwardly from the flange.

13. The lens assembly of claim 12 wherein the flange and the mounting posts are formed integrally with the cover member and the TIR body member.

14. The lens assembly of claim 1 wherein the cover member has a plurality of microlenses disposed in a front surface thereof.

15. The lens assembly of claim 1 wherein a front surface of the cover member is circular.

16. The lens assembly of claim 15 further comprising a plurality of mounting posts extending rearward from a region near a peripheral edge of the cover member.

* * * * *